US012647769B2

(12) United States Patent
Huang

(10) Patent No.: US 12,647,769 B2
(45) Date of Patent: Jun. 2, 2026

(54) WiFi ROAMING METHOD AND DEVICE, MOBILE TERMINAL, AND STORAGE MEDIUM

(71) Applicant: GUANGDONG OPPO MOBILE TELECOMMUNICATIONS CORP., LTD., Dongguan (CN)

(72) Inventor: Yuan Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 722 days.

(21) Appl. No.: 17/566,119

(22) Filed: Dec. 30, 2021

(65) Prior Publication Data

US 2022/0124480 A1     Apr. 21, 2022

Related U.S. Application Data

(63) Continuation of application No. PCT/CN2020/109998, filed on Aug. 19, 2020.

(30) Foreign Application Priority Data

Aug. 31, 2019     (CN) .......................... 201910819997.6

(51) Int. Cl.
    *H04W 8/12*     (2009.01)
    *H04W 48/04*     (2009.01)
    *H04W 80/02*     (2009.01)
(52) U.S. Cl.
    CPC ............. *H04W 8/12* (2013.01); *H04W 48/04* (2013.01); *H04W 80/02* (2013.01)

(58) Field of Classification Search
    CPC ........ H04W 8/12; H04W 48/04; H04W 80/02
    USPC .......................................................... 370/329
    See application file for complete search history.

(56) References Cited

U.S. PATENT DOCUMENTS

| | | |
|---|---|---|
| 7,277,724 B2 | 10/2007 | Jones et al. |
| 10,381,726 B1 | 8/2019 | Yeh |
| 2004/0219948 A1 | 11/2004 | Jones et al. |

(Continued)

FOREIGN PATENT DOCUMENTS

| | | |
|---|---|---|
| CN | 101366292 | 2/2009 |
| CN | 103096496 | 5/2013 |

(Continued)

OTHER PUBLICATIONS

IPI, Office Action for IN Application No. 202117061500, Jul. 1, 2022.

(Continued)

*Primary Examiner* — Chuck Huynh
(74) *Attorney, Agent, or Firm* — Hodgson Russ LLP

(57) ABSTRACT

A WiFi roaming method and device, a mobile terminal, and a storage medium are provided. The method includes the following. When both the first WiFi module and the second WiFi module are in a connected state, the first WiFi module is connected with an access point (AP) operating at a first frequency band, and the second WiFi module is connected with an AP operating at a second frequency band, the first frequency band being not overlapped with the second frequency band, the first WiFi module to be in a first roaming restriction mode to restrict the first WiFi module to roam in the first frequency band.

15 Claims, 5 Drawing Sheets

CONTROL BY A MOBILE TERMINAL THE FIRST WIFI MODULE CONNECTED WITH AN AP TO OPERATE AT A FIRST FREQUENCY BAND AND CONTROLLING THE SECOND WIFI MODULE CONNECTED WITH AN AP TO OPERATE AT A SECOND FREQUENCY BAND, WHEN BOTH THE FIRST WIFI MODULE AND THE SECOND WIFI MODULE ARE IN A CONNECTED STATE, THE FIRST FREQUENCY BAND BEING NOT OVERLAPPED WITH THE SECOND FREQUENCY BAND — 301

CONTROL BY THE MOBILE TERMINAL THE FIRST WIFI MODULE TO BE IN A FIRST ROAMING RESTRICTION MODE TO RESTRICT THE FIRST WIFI MODULE TO ROAM IN THE FIRST FREQUENCY BAND — 302

CONTROL BY THE MOBILE TERMINAL THE SECOND WIFI MODULE TO BE IN A SECOND ROAMING RESTRICTION MODE TO RESTRICT THE SECOND WIFI MODULE TO ROAM IN THE SECOND FREQUENCY BAND — 303

(56) References Cited

U.S. PATENT DOCUMENTS

| | | | | |
|---|---|---|---|---|
| 2007/0160017 A1* | 7/2007 | Meier | .................. | H04W 36/18 |
| | | | | 370/338 |
| 2008/0285504 A1* | 11/2008 | Lin | ..................... | H04W 16/26 |
| | | | | 370/331 |
| 2015/0103663 A1 | 4/2015 | Amini et al. | | |
| 2019/0166636 A1 | 5/2019 | Sahu et al. | | |
| 2020/0015047 A1* | 1/2020 | Song | ..................... | H04W 4/026 |
| 2021/0360650 A1 | 11/2021 | Huang | | |
| 2022/0159777 A1* | 5/2022 | Lin | ...................... | H04W 76/36 |

FOREIGN PATENT DOCUMENTS

| | | |
|---|---|---|
| CN | 105308919 | 2/2016 |
| CN | 105682191 | 6/2016 |
| CN | 105848231 | 8/2016 |
| CN | 106454973 | 2/2017 |
| CN | 106557311 | 4/2017 |
| CN | 106604314 | 4/2017 |
| CN | 106954237 | 7/2017 |
| CN | 108419278 | 8/2018 |
| CN | 108834223 | 11/2018 |
| CN | 109495970 | 3/2019 |
| CN | 109788519 | 5/2019 |
| CN | 109803318 | 5/2019 |
| CN | 110167201 | 8/2019 |
| EP | 3439357 | 2/2019 |
| IN | 110166218 | 8/2019 |
| KR | 20130119123 | 10/2013 |

OTHER PUBLICATIONS

EPO, Extended European Search Report for EP Application No. 20856631.5, Jul. 26, 2022.
CNIPA, First Office Action for CN Application No. 201910819997. 6, Jun. 28, 2021.
CNIPA, Second Office Action for CN Application No. 201910819997. 6, Dec. 9, 2021.
WIPO, International Search Report for PCT/CN2020/109998, Nov. 25, 2020.

* cited by examiner

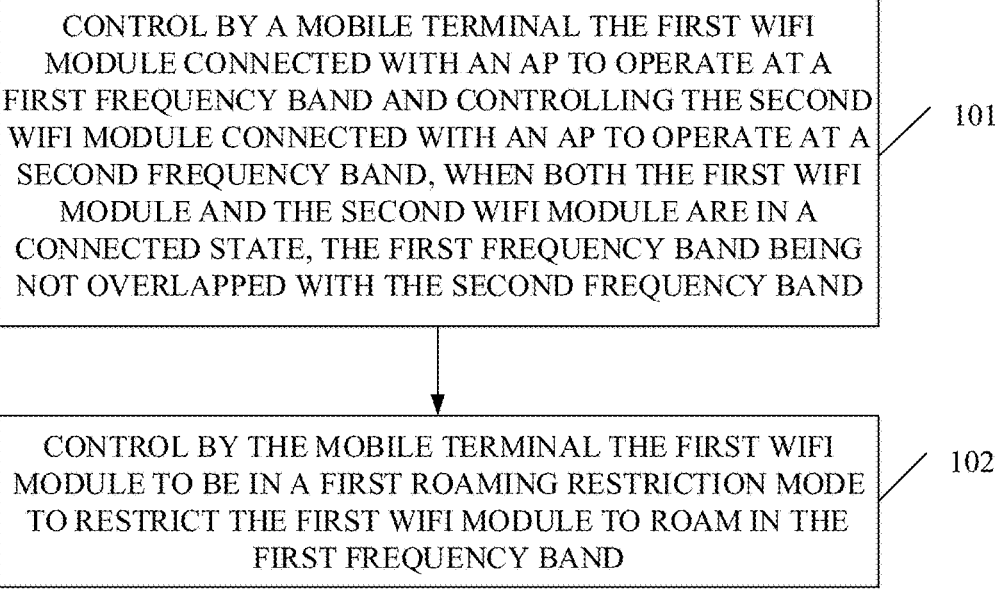

CONTROL BY A MOBILE TERMINAL THE FIRST WIFI MODULE CONNECTED WITH AN AP TO OPERATE AT A FIRST FREQUENCY BAND AND CONTROLLING THE SECOND WIFI MODULE CONNECTED WITH AN AP TO OPERATE AT A SECOND FREQUENCY BAND, WHEN BOTH THE FIRST WIFI MODULE AND THE SECOND WIFI MODULE ARE IN A CONNECTED STATE, THE FIRST FREQUENCY BAND BEING NOT OVERLAPPED WITH THE SECOND FREQUENCY BAND

101

CONTROL BY THE MOBILE TERMINAL THE FIRST WIFI MODULE TO BE IN A FIRST ROAMING RESTRICTION MODE TO RESTRICT THE FIRST WIFI MODULE TO ROAM IN THE FIRST FREQUENCY BAND

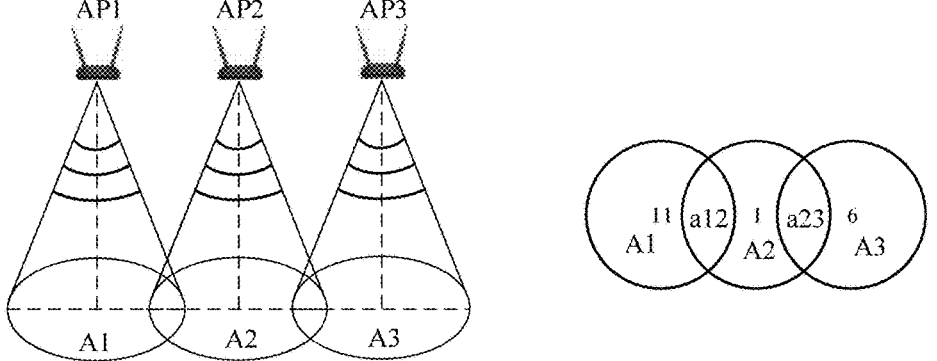

FIG. 2

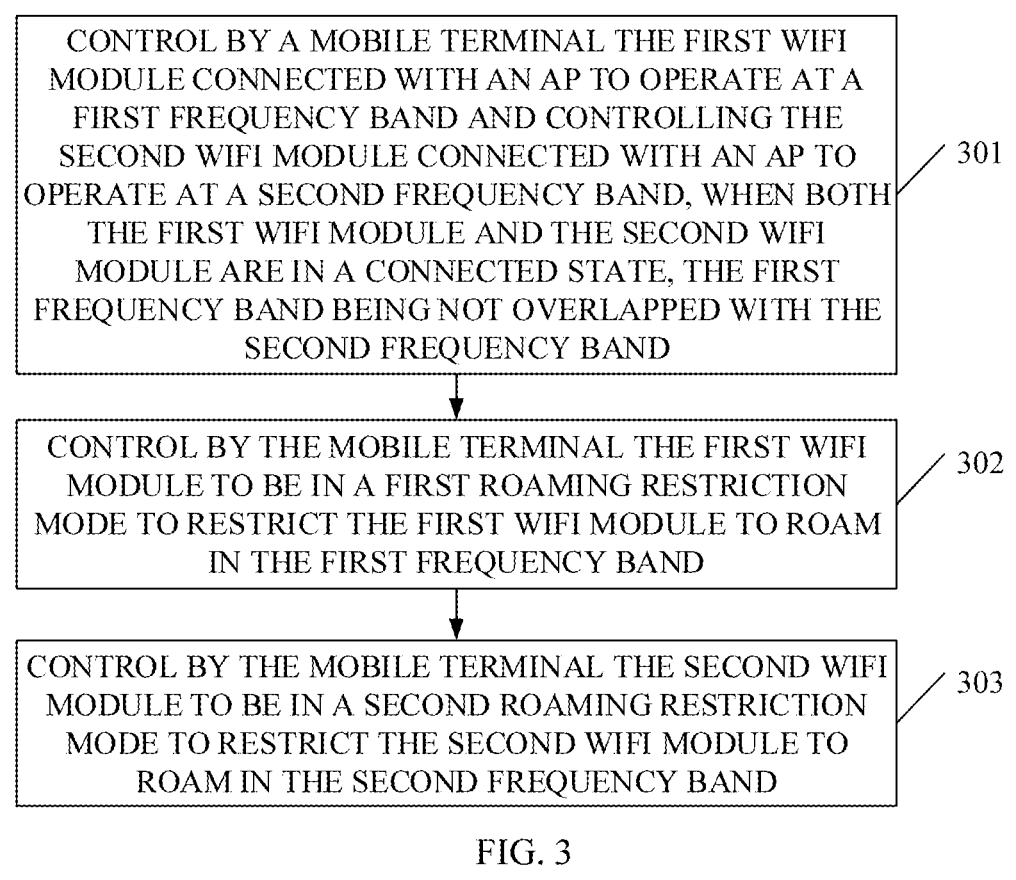

CONTROL BY A MOBILE TERMINAL THE FIRST WIFI MODULE CONNECTED WITH AN AP TO OPERATE AT A FIRST FREQUENCY BAND AND CONTROLLING THE SECOND WIFI MODULE CONNECTED WITH AN AP TO OPERATE AT A SECOND FREQUENCY BAND, WHEN BOTH THE FIRST WIFI MODULE AND THE SECOND WIFI MODULE ARE IN A CONNECTED STATE, THE FIRST FREQUENCY BAND BEING NOT OVERLAPPED WITH THE SECOND FREQUENCY BAND ⟋ 301

CONTROL BY THE MOBILE TERMINAL THE FIRST WIFI MODULE TO BE IN A FIRST ROAMING RESTRICTION MODE TO RESTRICT THE FIRST WIFI MODULE TO ROAM IN THE FIRST FREQUENCY BAND ⟋ 302

CONTROL BY THE MOBILE TERMINAL THE SECOND WIFI MODULE TO BE IN A SECOND ROAMING RESTRICTION MODE TO RESTRICT THE SECOND WIFI MODULE TO ROAM IN THE SECOND FREQUENCY BAND ⟋ 303

FIG. 3

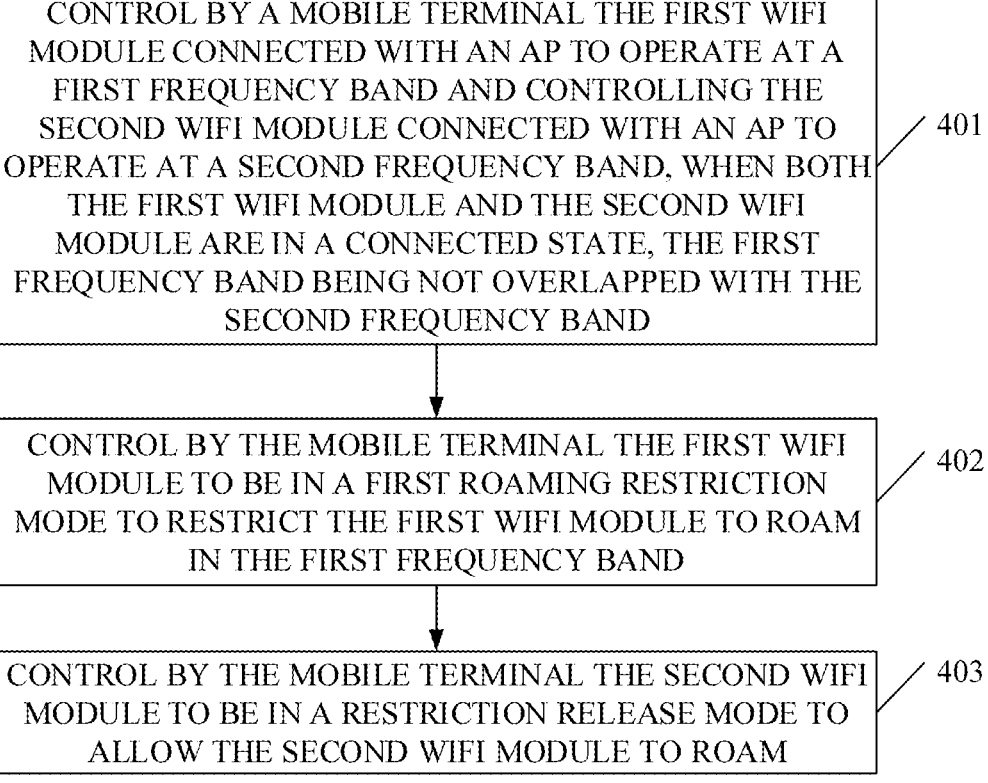

CONTROL BY A MOBILE TERMINAL THE FIRST WIFI MODULE CONNECTED WITH AN AP TO OPERATE AT A FIRST FREQUENCY BAND AND CONTROLLING THE SECOND WIFI MODULE CONNECTED WITH AN AP TO OPERATE AT A SECOND FREQUENCY BAND, WHEN BOTH THE FIRST WIFI MODULE AND THE SECOND WIFI MODULE ARE IN A CONNECTED STATE, THE FIRST FREQUENCY BAND BEING NOT OVERLAPPED WITH THE SECOND FREQUENCY BAND          401

CONTROL BY THE MOBILE TERMINAL THE FIRST WIFI MODULE TO BE IN A FIRST ROAMING RESTRICTION MODE TO RESTRICT THE FIRST WIFI MODULE TO ROAM IN THE FIRST FREQUENCY BAND          402

CONTROL BY THE MOBILE TERMINAL THE SECOND WIFI MODULE TO BE IN A RESTRICTION RELEASE MODE TO ALLOW THE SECOND WIFI MODULE TO ROAM          403

FIG. 4

WiFi ROAMING METHOD AND DEVICE, MOBILE TERMINAL, AND STORAGE MEDIUM

CROSS-REFERENCE TO RELATED APPLICATIONS

This application is a continuation of International Application No. PCT/CN2020/109998, filed on Aug. 19, 2020, which claims priority to Chinese Patent Application No. 201910819997.6, filed on Aug. 31, 2019, the entire disclosures of which are incorporated herein by reference.

TECHNICAL FIELD

The disclosure relates to a technical field of communications, in particular to a WiFi roaming method and device, a mobile terminal, and a storage medium.

BACKGROUND

Currently, latest products of chip solution vendors have a capability to work at both a 2.4G frequency band and a 5G frequency band simultaneously. With this hardware capability, one mobile terminal can simultaneously be connected with two different WiFi hotspots, and simultaneously use two WiFi networks to access the Internet, to obtain experiences with a faster network speed and a lower network delay. This function can be called "dual WiFi".

When the mobile terminal operates in a dual WiFi mode, it will be connected with two different WiFi networks simultaneously. If the two WiFi networks are in a same frequency band (that is, both are a 2.4G frequency band or a 5G frequency band), the two different WiFi networks need to operate in time-sharing, which leads to a larger delay of each WiFi network, an unstable network speed, and poor network transmission performance.

SUMMARY

In a first aspect, implementations of the disclosure provide a WiFi roaming method based on dual WiFi modules. The dual WiFi modules includes a first WiFi module and a second WiFi module, and the method includes the following.

When both the first WiFi module and the second WiFi module are in a connected state, the first WiFi module is connected with an access point (AP) operating at a first frequency band, and the second WiFi module is connected with an AP operating at a second frequency band, the first frequency band being not overlapped with the second frequency band, the first WiFi module to be in a first roaming restriction mode to restrict the first WiFi module to roam in the first frequency band.

In a second aspect, implementations of the present disclosure provide a mobile terminal, which includes a processor and a memory. The memory is configured to store one or more programs, the one or more programs are configured to be executed by the processor, and the programs include instructions for executing operations including the following. The first WiFi module is detected to operate at a first frequency band and the second WiFi module is detected to operate at a second frequency band when both the first WiFi module and the second WiFi module are in a connected state. The first frequency band is not overlapped with the second frequency band. The first WiFi module is controlled to be in a first roaming restriction mode to restrict the first WiFi module to roam in the first frequency band.

In a third aspect, implementations of the present disclosure provide a non-transitory computer-readable storage medium. The computer-readable storage medium stores a computer program for Electronic Data Interchange (EDI). The computer program causes a computer to execute part or all of operations described in the first aspect of the implementations of the present disclosure.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

FIG. 1 is a schematic flow diagram of a WiFi roaming method based on dual WiFi modules provided in implementations of the present disclosure.

FIG. 2 is a schematic diagram of channel selection of adjacent APs according to implementations provided in the present disclosure.

FIG. 3 is a schematic flow diagram of a WiFi roaming method based on dual WiFi modules provided in other implementations of the present disclosure.

FIG. 4 is a schematic flow diagram of a WiFi roaming method based on dual WiFi modules provided in other implementations of the present disclosure.

DETAILED DESCRIPTION

Figure 5:
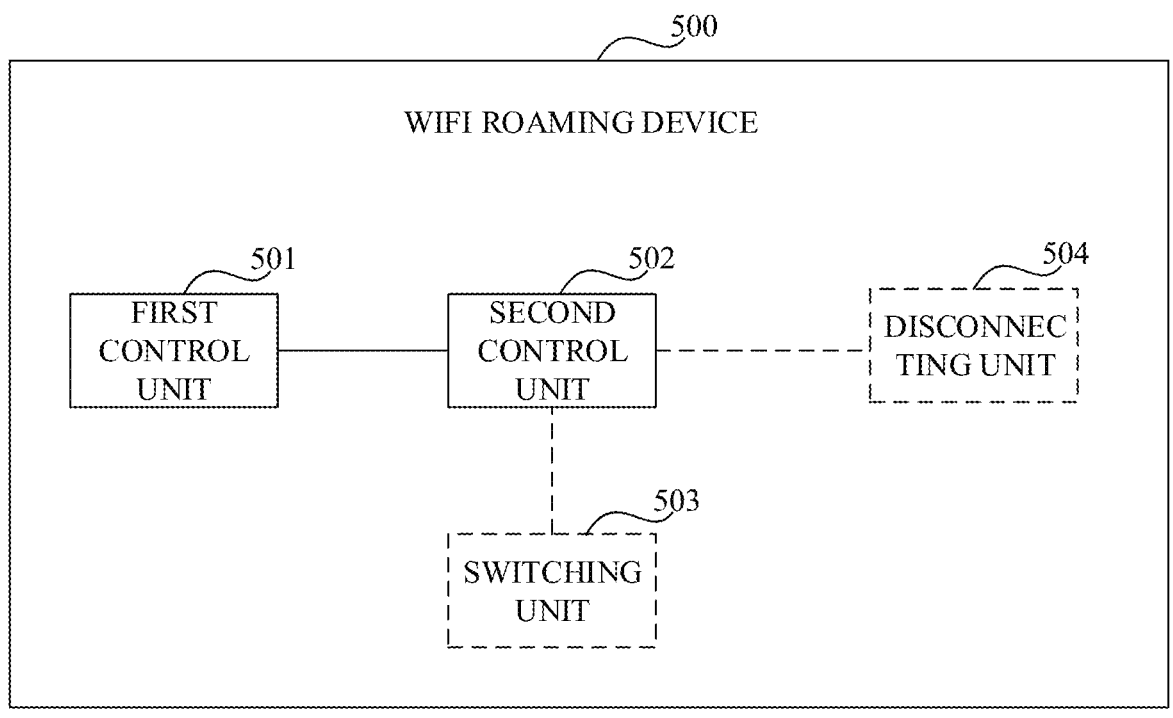
FIG. 5 is a schematic structural diagram of a WiFi roaming device provided in implementations of the present disclosure.

In order for those skilled in the art to better understand technical solutions of implementations, technical solutions of the implementations will be described clearly and completely with reference to accompanying drawings in the implementations. Apparently, implementations hereinafter described are merely some implementations, rather than all implementations, of present disclosure. All other implementations obtained by those of ordinary skill in the art based on the implementations herein without creative efforts shall fall within the protection scope of the present disclosure.

The terms "first", "second", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or device including a series of steps or units is not limited to the listed steps or units. Instead, it can optionally include other steps or units that are not listed; alternatively, other steps or units inherent to the process, method, product, or device can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

An electronic device referred to herein may include various handheld devices, in-vehicle devices, wearable devices, computing devices that have wireless communication functions or other processing devices connected with a wireless modem, as well as various forms of user equipment (UE), mobile stations (MS), terminal devices, and the like. For ease of description, the above-mentioned devices are collectively referred to as a mobile terminal.

Implementations of the present disclosure are explained in detail below.

Reference is made to FIG. 1, which is a schematic flow diagram of a WiFi roaming method based on dual WiFi modules provided in implementations of the present disclosure. As illustrated in FIG. 1, the WiFi roaming method based on dual WiFi modules includes the following.

At 101, when both the first WiFi module and the second WiFi module are in a connected state, the first WiFi module connected with an access point (AP) is controlled by a mobile terminal to operate at a first frequency band and the second WiFi module connected with an AP is controlled by the mobile terminal to operate at a second frequency band, where the first frequency band is not overlapped with the second frequency band.

In this implementation, WiFi (Wireless-Fidelity), also called wifi and Wi-Fi, is a wireless connection mode. The mobile terminal can include dual WiFi modules. The dual WiFi modules can include a first WiFi module (also called a first WiFi communication module) and a second WiFi module (also called a second WiFi communication module), which supports transmission and reception of signals simultaneously in two WiFi frequency bands and ensures that the signals in the two WiFi frequency bands do not interfere with each other.

The dual WiFi modules can be connected with two APs at the same time, for example, the first WiFi module is connected with a first AP and the second WiFi module is connected with a second AP. The dual WiFi modules can support data transmission and reception of two WiFi channels simultaneously. For example, the dual WiFi modules can support data transmission and reception of both a first WiFi channel and a second WiFi channel simultaneously. The first WiFi channel is a data channel established between the mobile terminal and a wireless network and connected via the first WiFi module and the first AP. The second WiFi path is a data channel established between the mobile terminal and the wireless network and connected via the second WiFi module and the second AP.

Each of the first WiFi module and the second WiFi module can support multiple frequency bands, for example, the first WiFi module supports a 2.4G (Hz) frequency band and a 5G (Hz) frequency band, and the second WiFi module also supports the 2.4G (Hz) frequency band and the 5G (Hz) frequency band.

The first WiFi module and the second WiFi module in the present disclosure are both in a Station mode (referred to as STA mode for short), and each of the first WiFi module and the second WiFi module needs to be connected a WiFi hotspot to access the WiFi network. The WiFi hotspot is a kind of AP. The AP may be a wireless AP.

A dual WiFi mode is a mode in which two WiFi modules transmit and receive data simultaneously. In the dual WiFi mode, the first WiFi module and the second WiFi module can operate simultaneously. The dual WiFi mode is in contrast to a single WiFi mode in which only one WiFi module operates, and the single WiFi mode can support the transmission and reception of signals in only one WiFi frequency band simultaneously. The dual WiFi modules of this implementation has a dual-band dual concurrent (DBDC) function or a dual-band simultaneous (DBS) function, and supports 2×2 antennas. Each of two groups of antennas is equipped with an amplifier circuit and a power amplifier chip, which can support antennas to transmit and receive signals simultaneously.

In this implementation, an operating frequency band of the AP connected with the first WiFi module is different from that of the AP connected with the second WiFi module. The AP connected with the first WiFi module operates in the first frequency band, and the AP connected with the second WiFi module operates in the second frequency band. For example, the first frequency band is a 2.4G frequency band and the second frequency band is a 5G frequency band, or the first frequency band is the 5G frequency band and the second frequency band is the 2.4G frequency band. Since the first WiFi module and the second WiFi module operates in different frequency bands, there is no interference between the first WiFi module and the second WiFi module when the first WiFi module and the second WiFi module transmit and receive signals simultaneously, and simultaneous transmission and reception of WiFi signals in two channels can be realizes, thus transmission efficiency of the WiFi network can be greatly improved.

At 102, the first WiFi module is controlled by the mobile terminal to be in a first roaming restriction mode to restrict the first WiFi module to roam in the first frequency band.

In this implementation of the disclosure, the WiFi roaming means that when there are multiple APs in a network environment and coverages of at least two APs overlap with each other to a certain extent because of limited coverage of each AP, with mobility of wireless Internet access, a wireless user with the mobile terminal can move in an entire coverage area of the multiple APs, and a wireless network card of the mobile terminal can automatically find an AP with the highest signal strength nearby and switch from a currently connected AP to the AP with the highest signal strength to transmit and receive data. In this way, the mobile terminal can be connected to a new AP to keep original Internet service and uninterrupted network connection maintained. A process that the mobile terminal changes from the currently connected AP to another AP and keeps network connection is called the WiFi roaming.

Generally, some basic configurations are needed to achieve WiFi roaming. Firstly, an AP+ access controller (AC) architecture needs to be deployed structurally. Secondly, it is required that a Service Set Identifier (SSID), an authentication mode, a client configuration of all APs are exactly the same as those configured in an AP network, and channels do not interfere with each other. In order to avoid interference, when the APs are deployed, channels of adjacent APs (which refer to spatially adjacent APs with overlapping coverage) are different, and the adjacent APs do not overlap and stagger in frequency. At the same time, an overlapping range of wireless coverages of deployed APs will be controlled (for example, the overlapping range can be controlled between 20% and 30%). For example, in the 2.4G frequency band, channel 1, channel 6, and channel 11 are three completely non-overlapping channels; and in the 5.8G frequency band, channel 149, channel 153, channel 157, channel 161, and channel 165 are five completely non-overlapping channels.

Specifically, reference is made to FIG. 2, which is a schematic diagram of channel selection of adjacent APs provided in implementations of the present disclosure. As illustrated in FIG. 2, taking the 2.4G frequency band as an example, multiple APs such as AP1, AP2 and AP3 are spatially deployed (for convenience of explanation, only three APs are illustrated in FIG. 2). A coverage of AP1 is A1, a coverage of AP2 is A2, and a coverage of AP3 is A3. An overlapping area of A1 and A2 is a12, and an overlapping area of A2 and A3 is a23. A channel of AP1 is the channel 11, a channel of AP2 is the channel 1, and a channel of AP3 is the channel 6. AP1 is adjacent to AP2, and AP2 is adjacent to AP3. When the wireless user with the mobile terminal is in a part of A1 without overlapping coverage (a part in A1 except a12), the mobile terminal selects AP1 for connection. When the wireless user with the mobile terminal moves from the part of A1 without the overlapping coverage to a12, the mobile terminal selects one of AP1 and AP2 with a higher signal strength for connection. If the mobile terminal selects AP2 for connection, the mobile terminal realizes a WiFi roaming from AP1 to AP2 (still in the 2.4G frequency band, only in a different channel). When the wireless user with the mobile terminal moves from a12 to a part of A2 without overlapping coverage (a part of A2 except a12 and a23), the mobile terminal selects AP2 for connection. When the wireless user with the mobile terminal moves from the part of A2 without the overlapping coverage to a23, the mobile terminal selects one of AP2 and AP3 with a higher signal strength for connection. If the mobile terminal selects AP3 for connection, the mobile terminal realizes a WiFi roaming from AP2 to AP3 (still in the 2.4G frequency band, only in a different channel). When the mobile terminal moves from a23 to a part of A3 without overlapping coverage (a part of A3 except a23), the mobile terminal selects AP3 for connection.

In the dual WiFi mode, if both the first WiFi module and the second WiFi module can perform a WiFi roaming, when a roaming frequency band of the first WiFi module is the same as that of the second WiFi module, in order to avoid interference, only one of the WiFi modules can operate, thus reducing operation efficiency of the dual WiFi module.

The first roaming restriction mode refers to a roaming mode that allows to roam in the first frequency band but not to other frequency bands.

In this implementation, operations at 102 may not be performed after operations at 101. Optionally, when both the first WiFi module and the second WiFi module are in the connected state, the first WiFi module is connected with an AP operating at the first frequency band, the second WiFi module is connected with an AP operating at the second frequency band, and the first frequency band being not overlapped with the second frequency band, proceed to operations at 102. Optionally, after detecting that the first WiFi module operates at the first frequency band and the second WiFi module operates at the second frequency band when both the first WiFi module and the second WiFi module are in a connected state, proceed to operations at 102.

In this implementation, with the dual WiFi modules, the mobile terminal sets the first WiFi module in the first roaming restriction mode to restrict the first WiFi module to roam only in the first frequency band, to avoid a situation that the first WiFi module roams to the second frequency band where the AP connected with the second WiFi module is located to cause interference of the first WiFi module with the second WiFi module, thereby improving the network transmission performance of the dual WiFi modules.

Reference is made to FIG. 3, which is a schematic flow diagram of a WiFi roaming method based on dual WiFi modules provided in other implementations of the present disclosure. As illustrated in FIG. 3, the WiFi roaming method based on dual WiFi modules includes the following.

At 301, when both the first WiFi module and the second WiFi module are in a connected state, the first WiFi module connected with an AP is controlled by a mobile terminal to operate at a first frequency band and the second WiFi module connected with an AP is controlled by the mobile terminal to operate at a second frequency band, where the first frequency band is not overlapped with the second frequency band.

At 302, the first WiFi module is controlled by the mobile terminal to be in a first roaming restriction mode to restrict the first WiFi module to roam in the first frequency band.

Implementations of operations at 301 to 302 in this implementation can be referred to that of operations at 201 to 202 in FIG. 2, which will not be repeated here.

At 303, the second WiFi module is controlled by the mobile terminal to be in a second roaming restriction mode to restrict the second WiFi module to roam in the second frequency band.

An execution order of the operations at 302 and operations at 303 is not limited, and the operations at 302 and the operations at 303 can be executed simultaneously, the operations at 302 can be executed before the operations at 303, or the operations at 302 can be executed after the operations at 303.

The second roaming restriction mode refers to a roaming mode that allows to roam in the second frequency band but not to other frequency bands.

In this implementation of the disclosure, after controlling the first WiFi module to be in the first roaming restriction mode, the mobile terminal can also control the second WiFi module to be in the second roaming restriction mode, so that both WiFi modules enter a roaming restriction mode to respectively restrict the two WiFi modules to roam in different frequency bands, thereby avoiding the first WiFi module to roam to the second frequency band where the AP connected with the second WiFi module is located or the second WiFi module to roam to the first frequency band where the AP connected with the first WiFi module is located, which may cause the first WiFi module and the second WiFi module to interfere with each other. By limiting part of roaming functions of the first WiFi module and the second WiFi module, interference caused by roaming of the first WiFi module and the second WiFi module can be avoided, thereby improving the network transmission performance of the dual WiFi modules.

As an implementation, the method illustrated in in FIG. 3 may further includes the following.

When the first WiFi module is in a disconnected state and the second WiFi module is in the connected state, on condition that the second WiFi module is in the roaming restriction mode, the second WiFi module is switched by the mobile terminal from a roaming restriction mode to a restriction release mode to release a roaming frequency-band restriction for the second WiFi module.

The roaming restriction mode refers to a roaming mode that allows to roam in a certain frequency band but not to other frequency bands. The roaming restriction mode may include the first roaming restriction mode or the second roaming restriction mode.

The restriction release mode is a free roaming mode that allows to roam to any frequency band.

There are many reasons why the first WiFi module is in the disconnected state, for example, the first WiFi module stops operating due to failure, power supply and other reasons. For example, because the first WiFi module was originally restricted to roam in the first frequency band, the first WiFi module will be forced to be disconnected when there is no available AP in the first frequency band near the mobile terminal.

In this implementation of the present disclosure, when the first WiFi module is in the disconnected state and only the second WiFi module is in the connected state, if the second WiFi module is still in the roaming restriction mode, the second WiFi module is switched by the mobile terminal from the roaming restriction mode to the restriction release mode to release the roaming frequency-band restriction for the second WiFi module and allow the second WiFi module to roam between the first frequency band and the second frequency band. For example, the second WiFi module is allowed to roam between the 2.4G frequency band and the 5G frequency band when the first WiFi module is in the disconnected state and only the second WiFi module is in the connected state.

Because only one WiFi module is in the connected state and the WiFi module supports multiple frequency bands, the WiFi module can be allowed to roam in multiple frequency bands, thus improving the network transmission performance with a single WiFi module.

As an implementation, if a reason why the first WiFi module is disconnected is that the first WiFi module was originally restricted to roam in the first frequency band, and there is no available AP in the first frequency band near the mobile terminal, the mobile terminal will determine which WiFi module to operate according to historical signal transceiving capabilities of the first WiFi module and the second WiFi module in the second frequency band. There is no available AP in the first frequency band near the mobile terminal, which means that the mobile terminal is not in the coverage of APs in the first frequency band, that is, the mobile terminal cannot search for the APs in the first frequency band.

Specifically, if there is no available AP in the first frequency band near the mobile terminal, but only available APs in the second frequency band, the mobile terminal will compare the historical signal transceiving capabilities of the first WiFi module and the second WiFi module in the second frequency band, and select a WiFi module with a higher historical signal transceiving capability in the second frequency band to operate in the second frequency band (select the WiFi module with the higher historical signal transceiving capability in the second frequency band to be connected with the AP in the second frequency band that can be searched for nearby). If there is no available AP in the second frequency band near the mobile terminal, but only available APs in the first frequency band, the mobile terminal will compare the historical signal transceiving capabilities of the first WiFi module and the second WiFi module in the first frequency band, and select a WiFi module with a higher historical signal transceiving capability in the first frequency band to operate in the first frequency band (select the WiFi module with the higher historical signal transceiving capability in the first frequency band to be connected with the AP in the first frequency band that can be searched for nearby).

The historical signal transceiving capability of the first WiFi module in the second frequency band is determined based on historical average transmission power of the first WiFi module in the second frequency band, historical average transmission delay of the first WiFi module in the second frequency band, a historical average packet loss rate of the first WiFi module in the second frequency band, a historical average downlink transmission rate of the first WiFi module in the second frequency band, and a historical average uplink transmission rate of the first WiFi module in the second frequency band.

Generally, the larger the historical average transmission power of the first WiFi module in the second frequency band, the higher the historical signal transceiving capability of the first WiFi module in the second frequency band; the lower the historical average transmission delay of the first WiFi module in the second frequency band, the higher the historical signal transceiving capability of the first WiFi module in the second frequency band; the lower the historical average packet loss rate of the first WiFi module in the second frequency band, the higher the historical signal transceiving capability of the first WiFi module in the second frequency band; the higher the historical average downlink transmission rate of the first WiFi module in the second frequency band, the higher the historical signal transceiving capability of the first WiFi module in the second frequency band; the higher the historical average uplink transmission rate of the first WiFi module in the second frequency band, the higher the historical signal transceiving capability of the first WiFi module in the second frequency band.

For example, the historical signal transceiving capability of the first WiFi module in the second frequency band can be calculated by the following formula:

$$P=a1*b1+a2*b2+a3*b3+a4*b4+a5*b5;$$

where, P represents the historical signal transceiving capability of the first WiFi module in the second frequency band, b1 represents the historical average transmission power of the first WiFi module in the second frequency band, b2 represents the historical average transmission delay of the first WiFi module in the second frequency band, b3 represents the historical average packet loss rate of the first WiFi module in the second frequency band, b4 represents the historical average downlink transmission rate of the first WiFi module in the second frequency band, and b5 represents the historical average uplink transmission rate of the first WiFi module in the second frequency band. a1, a2, a3, a4, and a5 are weighting coefficients corresponding to b1, b2, b3, b4, and b5 respectively.

Specifically, the mobile terminal can also select a corresponding WiFi module according to a corresponding relationship between types of applications running in the foreground and reference indexes of the signal transceiving capability that are needed in prioritization (the reference indexes of the signal transceiving capability can include the average transmission power, the average packet loss rate, the average downlink transmission rate, the average uplink transmission rate, etc.). For example, if an application running in the foreground (i.e., foreground application) is a game application, the mobile terminal chooses a WiFi module with a lowest average transmission delay in the second frequency band to operate. For example, if the foreground application is a video application, the mobile terminal chooses a WiFi module with a highest average downlink transmission rate in the second frequency band to operate. According to this implementation of the present disclosure, an appropriate WiFi module can be selected to operate according to magnitude of the reference index of the signal transceiving capability that the foreground application needs in prioritization, to improve use experience for the application running in the foreground during the WiFi roaming.

As an implementation, the method illustrated in FIG. 3 may further includes the following.

When the second WiFi module is in the disconnected state and the first WiFi module is in the connected state, on condition that the first WiFi module is in the roaming restriction mode, the first WiFi module is switched from the roaming restriction mode to the restriction release mode to release the roaming frequency-band restriction for the first WiFi module.

There are many reasons why the second WiFi module is in the disconnected state, for example, the second WiFi module stops operating due to failure, power supply and other reasons. For example, because the second WiFi module was originally restricted to roam in the second frequency band, the second WiFi module will be forced to be disconnected when there is no available AP in the second frequency band near the mobile terminal.

In this implementation, when the second WiFi module is in the disconnected state and only the first WiFi module is in the connected state, if the first WiFi module is still in the roaming restriction mode, the first WiFi module is switched by the mobile terminal from the roaming restriction mode to the restriction release mode to release the roaming frequency-band restriction for the first WiFi module and allow the first WiFi module to roam between the first frequency band and the second frequency band. For example, the first WiFi module is allowed to roam between the 2.4G frequency band and the 5G frequency band when the second WiFi module is in the disconnected state and only the first WiFi module is in the connected state.

Because only one WiFi module is in the connected state and the WiFi module supports multiple frequency bands, the WiFi module can be allowed to roam in multiple frequency bands, thus improving the network transmission performance with a single WiFi module.

As an implementation, if a reason why the second WiFi module is disconnected is that the second WiFi module was originally restricted to roam in the second frequency band, and there is no available AP in the second frequency band near the mobile terminal, the mobile terminal will determine which WiFi module to operate according to historical signal transceiving capabilities of the first WiFi module and the second WiFi module in the second frequency band. There is no available AP in the second frequency band near the mobile terminal, which means that the mobile terminal is not in the coverage of APs in the second frequency band, that is, the mobile terminal cannot search for the APs in the second frequency band.

It should be noted that the first WiFi module and the second WiFi module in the dual WiFi modules shown in FIG. 3 have no obvious master-slave relationship, but an equal cooperative or competitive relationship.

Reference is made to FIG. 4, which is a schematic flow diagram of a WiFi roaming method based on dual WiFi modules provided in other implementations of the present disclosure. As illustrated in FIG. 4, the WiFi roaming method based on dual WiFi modules includes the following.

At 401, when both the first WiFi module and the second WiFi module are in a connected state, the first WiFi module connected with an AP is controlled by a mobile terminal to operate at a first frequency band and the second WiFi module connected with an AP is controlled by the mobile terminal to operate at a second frequency band, where the first frequency band is not overlapped with the second frequency band.

At 402, the first WiFi module is controlled by the mobile terminal to be in a first roaming restriction mode to restrict the first WiFi module to roam in the first frequency band.

Implementations of operations at 401 to 402 in this implementation can be referred to that of operations at 201 to 202 in FIG. 2, which will not be repeated here.

At 403, the second WiFi module is controlled by the mobile terminal to be in the restriction release mode to allow the second WiFi module to roam.

The restriction release mode refers to a roaming mode in which a roaming restriction is released and free roaming is allowed, that is, roaming in any frequency band is allowed.

In this implementation, the second WiFi module is a main WiFi module, and the second WiFi module is allowed to roam freely, while the first WiFi module is a slave WiFi module, which is in the first roaming restriction mode and can only roam in the first frequency band.

The main WiFi module refers to a mainly used WiFi module, which is in contrast to the slave WiFi module, and the slave WiFi module is a module that assists the main WiFi module in link aggregation.

Performance indexes of the main WiFi module (such as the transmission power, the transmission delay, the packet loss rate, the downlink transmission rate, the uplink transmission rate, etc.) are generally better than those of the slave WiFi module.

The link aggregation means that the mobile terminal can use two or more network ports to access the Internet at the same time, and refers to intelligently distributing users' Internet access requests to different Internet-accessible interfaces (an interface corresponding to the first WiFi module and an interface corresponding to the second WiFi module). Because the dual WiFi modules can support two WiFi channels to transmit and receive data simultaneously, the mobile terminal can distribute data packets to be transmitted in the first WiFi channel and the second WiFi channel for transmission, thus improving data transmission throughput of the WiFi network.

In this implementation of the present disclosure, the roaming restriction is not imposed on the main WiFi module, and the main WiFi module is allowed to roam freely. For the slave WiFi module, the roaming restriction is imposed on the slave WiFi module in order to avoid interference of the slave WiFi module with the main WiFi module. The performance of the main WiFi module can be maximized, thus improving the data transceiving capabilities of the main WiFi module.

As an implementation, after operations at 402 are performed, the following can be further performed.

The first WiFi module is disconnected by the mobile terminal once the second WiFi module roams to the first frequency band.

In this implementation of the disclosure, since the main WiFi module (the second WiFi module) can roam freely, once the main WiFi module roams to a frequency band where the AP connected with the slave WiFi module (the first WiFi module) operates, the slave WiFi module can be disconnected actively to avoid the interference of the slave WiFi module with the main WiFi module, to give priority to operations of the main WiFi module.

As an implementation, after operations at 402 are performed, the following can be further performed.

The first WiFi module is controlled to switch from the first roaming restriction mode to the second roaming restriction mode to restrict the first WiFi module to roam in the second frequency band, once the second WiFi module roams to the first frequency band.

In this implementation of the disclosure, since the main WiFi module (the second WiFi module) can roam freely, once the main WiFi module roams to a frequency band where the AP connected with the slave WiFi module (the first WiFi module) operates, the slave WiFi module can be controlled to roam to other frequency bands, to give priority to operations of the main WiFi module.

For example, once the second WiFi module roams to the first frequency band, the first WiFi module is controlled by the mobile terminal to switch from the first roaming restriction mode to the second roaming restriction mode to restrict the first WiFi module to roam in the second frequency band. In this way, the first WiFi module and the second WiFi module operates in different frequency bands respectively without mutual interference. In the dual WiFi mode, on a premise that the main WiFi module can roam freely, it can be guaranteed that the two WiFi modules simultaneously transmit and receive data, thus improving the data transceiving capabilities and user experience.

The first WiFi module and the second WiFi module of the dual WiFi modules in FIGS. 1 to 4 can be integrated in a same WiFi chip, that is, the mobile terminal adopts a single WiFi chip. The first WiFi module and the second WiFi module in the dual WiFi modules in FIGS. 1 to 4 can also be respectively integrated in two different WiFi chips, that is, the mobile terminal adopts a dual WiFi chips. In the single WiFi chip, when the first WiFi module and the second WiFi module operate in a same frequency band, even if they operate in different channels, the interference is still large, and the single WiFi chip needs to operate in time-sharing. In the dual WiFi chips, when the first WiFi module and the second WiFi module operate in the same frequency band, if they operate in different channels, the interference is relatively small, and the first WiFi module and the second WiFi module of the dual WiFi chips can operate simultaneously.

The foregoing solution of the implementations of the present disclosure is mainly described from the viewpoint of execution process of the method. It can be understood that, in order to implement the above functions, the electronic device includes hardware structures and/or software modules corresponding to the respective functions. Those skilled in the art should readily recognize that, in combination with units and method steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementations should not be considered as beyond the scope of the present disclosure.

According to the implementations of the present disclosure, functional units may be divided for the electronic device in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations is schematic, and is merely a logical function division, and there may be other division manners in actual implementation.

Reference is made to FIG. 5, which is a schematic structural diagram of a WiFi roaming device provided in implementations of the present disclosure. The WiFi roaming device is applicable to dual WiFi modules, and the dual WiFi modules include a first WiFi module and a second WiFi module. The WiFi roaming device 500 includes a first control unit 501 and a second control unit 502.

The first control unit 501 is configured to control the first WiFi module connected with an access point (AP) to operate at a first frequency band and control the second WiFi module connected with an AP to operate at a second frequency band, when both the first WiFi module and the second WiFi module are in a connected state, the first frequency band being not overlapped with the second frequency band.

The second control unit 502 is configured to control the first WiFi module to be in a first roaming restriction mode to restrict the first WiFi module to roam in the first frequency band.

As an implementation, the second control unit 502 is further configured to control the second WiFi module to be in a second roaming restriction mode, to restrict the second WiFi module to roam in the second frequency band.

As an implementation, the WiFi roaming device 500 further includes a switching unit 503. The switching unit 503 is configured to switch the second WiFi module from a roaming restriction mode to a restriction release mode to release a roaming frequency-band restriction for the second WiFi module, on condition that the first WiFi module is in a disconnected state when the second WiFi module is in the connected state and the second WiFi module is in the roaming restriction mode.

As an implementation, the switching unit 503 is further configured to switch the first WiFi module from a roaming restriction mode to a restriction release mode to release a roaming frequency-band restriction for the first WiFi module, on condition that the second WiFi module is in a disconnected state when the first WiFi module is in the connected state and the first WiFi module is in the roaming restriction mode.

As an implementation, the second WiFi module is a main WiFi module, and the second control unit 502 is further configured to control the second WiFi module to be in a restriction release mode to allow the second WiFi module to roam.

As an implementation, the WiFi roaming device 500 further includes a disconnecting unit 504. The disconnecting unit 504 is configured to disconnect the first WiFi module on condition that the second WiFi module roams to the first frequency band, after the second control unit controls the first WiFi module to be in the first roaming restriction mode to restrict the first WiFi module to roam in the first frequency band.

As an implementation, the second control unit 502 is further configured to control the first WiFi module to switch from the first roaming restriction mode to a second roaming restriction mode to restrict the first WiFi module to roam in the second frequency band on condition that the second WiFi module roams to the first frequency band, after controlling the first WiFi module to be in the first roaming restriction mode to restrict the first WiFi module to roam in the first frequency band The first control unit 501, the second control unit 502, the switching unit 503, and the disconnecting unit 504 illustrated in FIG. 5 may specifically be processors.

By means of the WiFi roaming device 500 illustrated in FIG. 5, with the dual WiFi modules, the mobile terminal sets the first WiFi module in the first roaming restriction mode to restrict the first WiFi module to roam only in the first frequency band, to avoid a situation that the first WiFi module roams to the second frequency band where the AP connected with the second WiFi module is located to cause interference of the first WiFi module with the second WiFi module, thereby improving the network transmission performance of the dual WiFi modules.

Figure 6:
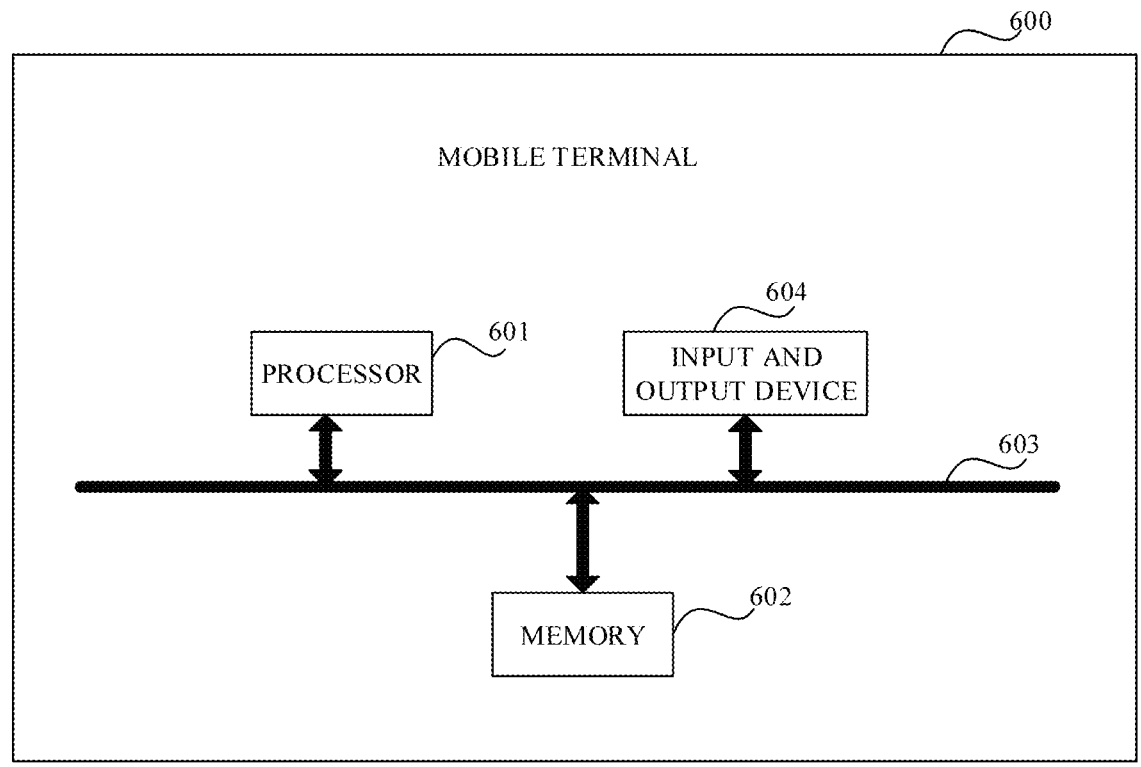
FIG. 6 is a schematic structural diagram of a mobile terminal provided in implementations of the present disclosure.

Reference is made to FIG. 6, which is a schematic structural diagram of a mobile terminal provided in implementations of the present disclosure. As illustrated in FIG. 6, the mobile terminal 600 includes a processor 601 and a memory 602. The mobile terminal 600 may also include a bus 603, and the processor 601 and the memory 602 may be connected with each other via the bus 603. The bus 603 may be a peripheral component interconnect (PCI) standard bus or an extended industry standard architecture (EISA) bus, etc. The bus 603 can be divided into an address bus, a data bus, a control bus, and so on. For ease of representation, only one thick line is used in FIG. 6 for illustration, but it does not mean that there is only one bus or one type of bus. The mobile terminal 600 may further include an input and output device 604, and the input and output device 604 may include a display screen, such as a liquid crystal display (LCD) screen. The memory 602 is used to store one or more programs containing instructions. The processor 601 is used to call the instructions stored in the memory 602 to execute some or all of operations of the method in FIGS. 1 to 4.

By means of the mobile terminal 600 illustrated in FIG. 6, with the dual WiFi modules, the mobile terminal sets the first WiFi module in the first roaming restriction mode to restrict the first WiFi module to roam only in the first frequency band, to avoid a situation that the first WiFi module roams to the second frequency band where the AP connected with the second WiFi module is located to cause interference of the first WiFi module with the second WiFi module, thereby improving the network transmission performance of the dual WiFi modules.

Figure 7:
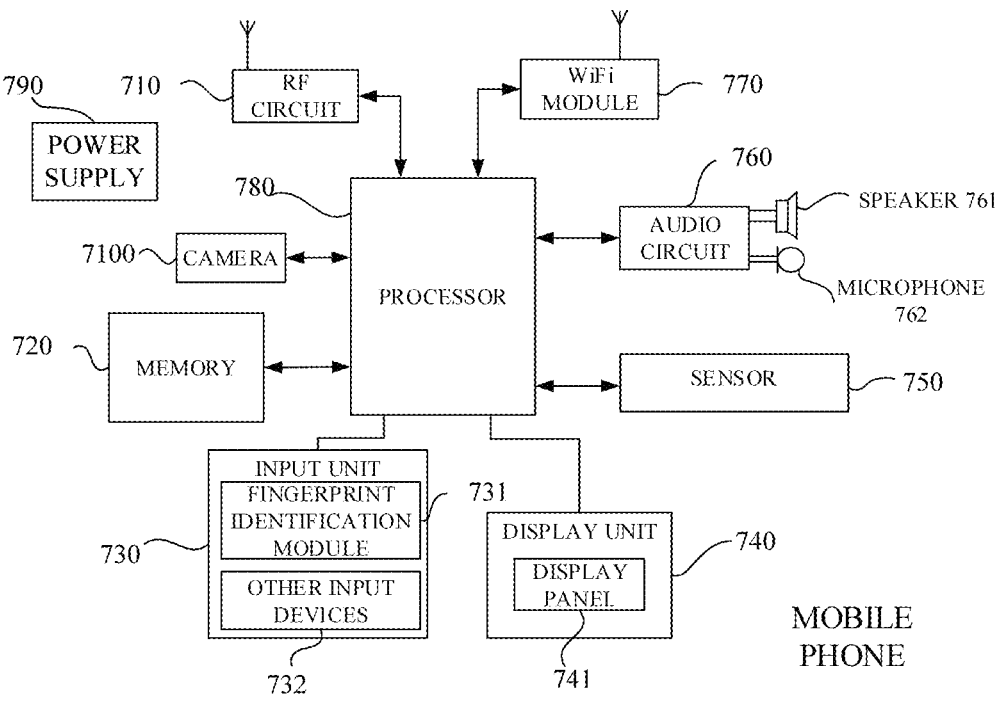
FIG. 7 is a schematic structural diagram of a mobile terminal provided in other implementations of the present disclosure.

Implementations of the present disclosure also provide another electronic device. For ease of description, only parts related to implementations of the present disclosure are described and for specific technical details that are not described, reference can be made to method implementations of the present disclosure. As illustrated in FIG. 7, the electronic device can include a mobile phone, a tablet computer, a personal digital assistant (PDA), a point of sales (POS), an in-vehicle computer, and other terminal devices. A mobile phone will be taken as an example of the electronic device in the following.

FIG. 7 is a schematic structural diagram of a part of structures of the mobile phone that is related to the electronic device provided in implementations. As illustrated in FIG. 5, the mobile phone includes: a radio frequency (RF) circuit 710, a memory 720, an input unit 730, a display unit 740, a sensor 750, an audio circuit 760, a WiFi module 770, a processor 780, a power supply 790, and other elements. It will be appreciated by those skilled in the art that the present disclosure is not limited by the mobile phone as illustrated in FIG. 7. More or fewer elements than that as illustrated in FIG. 7 can be included, some elements may be or combined, or elements can be arranged differently.

Hereinafter, detailed description of each element of the mobile phone will be given below with reference of FIG. 7.

The RF circuit 710 can be configured to receive and transmit information. Generally, the RF circuit 710 includes but is not limited to an antenna, at least one amplifier, a transceiver, a coupler, a low noise amplifier (LNA), a duplexer, and the like. Furthermore, the RF circuit 710 may also be configured to communicate with a network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 720 is configured to store software programs and modules. The processor 780 is configured to execute various function applications and data processing of the mobile phone by running the software programs and the modules stored in the memory 720. The memory 720 can mainly include a program storage area and a data storage area. The program storage area can store an operating system, at least one application required by function, and so on. The data storage area can store data created according to use of the mobile phone, and so on. In addition, the memory 720 can include a high-speed random access memory (RAM), and can further include a non-volatile memory such as at least a disk storage device, a flash device, or other non-volatile solid storage devices.

The input unit 730 is configured to receive input digital or character information and to generate key signal input associated with user setting and functional control of the mobile phone. Specifically, the input unit 730 may include a fingerprint identification module 731 and other input devices 732. The fingerprint identification module 731 is configured to collect use's fingerprint data thereon. The input unit 730 can further include other input devices 732 in addition to the fingerprint identification module 731. Specifically, the other input devices 732 can include, but are not limited to, one or more of a touch screen, a physical keyboard, a functional key (such as a volume control key, a switch key, and so on), a track ball, a mouse, and an operating rod.

The display unit 740 is configured to display information input by the user, information provided for the user, or various menus of the mobile phone. The display unit 740 can include a display panel 741. As an implementation, the display panel 741 may be configured in the form of a liquid crystal display (LCD), an organic or inorganic light-emitting diode, and so on.

The mobile phone may also include at least one sensor 750, such as a light sensor, a motion sensor, a pressure sensor, a temperature sensor, and other sensors. Specifically, the light sensor may include an ambient light sensor (or a light ray sensor) and a proximity sensor. The ambient light sensor can be configured to adjust the brightness of the mobile phone's backlight according to ambient lights, so as to adjust the brightness of the display panel 741. The proximity sensor can be configured to turn off the display panel 741 and/or backlight when the mobile phone reaches nearby the ear. As one kind of motion sensor, an accelerometer sensor can be configured to detect the magnitude of acceleration in different directions (typically three axes) and the accelerometer sensor can also be configured to detect the magnitude and direction of gravity when mobile phone is stationary. The accelerometer sensor can also be configured to identify mobile-phone gestures related applications (such as vertical and horizontal screen switch, related games, magnetometer attitude calibration), and can be used for vibration-recognition related functions (such as a pedometer, or percussion), and so on. The mobile phone can also be equipped with other sensors such as a gyroscope, a barometer, a hygrometer, a thermometer, an infrared sensor, etc., which will not be repeated herein.

The audio circuit 760, the speaker 761, and the microphone 762 can provide an audio interface between the user and the mobile phone. On one hand, the audio circuit 760 can be configured to convert received audio data into electrical signals and transfer the electrical signals to the speaker 761; the speaker 761 is configured to convert the electrical signals received into sound signals for output. On the other hand, the microphone 762 is configured to convert the received sound signals into electrical signals, which will be received and then converted into audio data by the audio circuit 760. The audio data is then transmitted to the processor 780 to be processed. The audio data processed by the processor 780 is transmitted to another mobile phone via an RF circuit 710 for example or is output to the memory 720 for further processing.

WiFi belongs to a short-range wireless transmission technology. With aid of the WiFi module 770, the mobile phone may assist the user in E-mail receiving and sending, webpage browsing, access to streaming media, and the like. WiFi provides users with wireless broadband Internet access. The WiFi module 770 illustrated in FIG. 5 may be dual WiFi modules, which include a first WiFi module and a second WiFi module and can be integrated into a WiFi Chip specifically.

The processor 780 is a control center of the mobile phone, and is configured to connect all parts of the whole mobile phone by utilizing various interfaces and lines, to run or execute the software programs and/or the modules stored in the memory 720, and to call data stored in the memory 720 to execute various functions and data processing of the mobile phone, so as to monitor the mobile phone as a whole. As an implementation, the processor 780 can include one or more processing units. As an implementation, the processor 780 may be integrated with an application processor and a modulation-demodulation processor. The application processor is mainly configured to process an operating system, a user interface, an application program, and the like, and the modulation-demodulation processor is mainly configured to process wireless communication. It can be noted that the modulation-demodulation processor may not be integrated into the processor 780.

The mobile phone also includes a power supply 790 (e.g., a battery) that supplies power to various elements. As an implementation, the power supply 790 may be logically connected with the processor 780 via a power management system to achieve management of charging, discharging, and power consumption through the power management system.

The mobile phone also includes a camera 7100, and the camera 7100 is configured to capture images and videos and transmit the images and videos captured to the processor 780 for processing.

Although not illustrated, the mobile phone may include a Bluetooth® module, etc., and the present disclosure will not elaborate herein.

The methods of the foregoing implementations as illustrated in FIGS. 1-4 can be implemented based on the structure of the mobile phone.

A non-transitory computer storage medium is also provided in implementations of the present disclosure. The computer storage medium is configured to store programs which, when executed, are operable to execute some or all of the operations of any of the WiFi roaming methods based on dual WiFi modules as described in the above-described method implementations.

A computer program product is also provided in implementations of the present disclosure. The computer program product includes a non-transitory computer-readable storage medium that stores computer programs. The computer programs are operable with a computer to execute some or all operations of any of the WiFi roaming methods based on dual WiFi modules as described in the above-described method implementations.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in an implementation, reference may be made to related descriptions in other implementations.

In the implementations of the present disclosure, it is to be noted that, the apparatus disclosed in implementations provided herein may be implemented in other manners. For example, the apparatus implementations described above are merely illustrative; for instance, the division of the unit is only a logical function division and there can be other manners of division during actual implementations; for example, multiple units or components may be combined or may be integrated into another system, or some features may be ignored, omitted, or not performed. In addition, coupling or direct coupling or communication connection between each illustrated or discussed component may be indirect coupling or communication connection via some interfaces, devices, or units, and may be electrical connection, or other forms of connection.

The units described as separate components may or may not be physically separated, and the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a USB (universal serial bus) flash disk, a read-only memory (ROM), a RAM, a removable hard disk, a disk, a compact disc (CD), or the like.

It will be noted by those of ordinary skill in the art that all or a part of the various methods of the implementations described above may be accomplished by means of a program to instruct associated hardware, where the program may be stored in a computer-readable memory, which may include a flash memory, a ROM, a RAM, a disk or a CD, and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A WiFi roaming method performed by a mobile terminal having dual WiFi modules, the dual WiFi modules comprising a first WiFi module and a second WiFi module, the first WiFi module and the second WiFi module are each capable of operating in both a first frequency band and a second frequency band, the first WiFi module and the second WiFi module are capable of operating simultaneously, the method comprising:

controlling the first WiFi module to be in a first roaming restriction mode to restrict the first WiFi module to roam in the first frequency band, in response to both the first WiFi module and the second WiFi module being in a connected state, the first WiFi module being connected with an access point (AP) operating at the first frequency band, and the second WiFi module being connected with an AP operating at the second frequency band, the first frequency band being not overlapped with the second frequency band; and controlling the second WiFi module to be in a second roaming restriction mode to restrict the second WiFi module to roam in the second frequency band; and wherein the method further comprises:

switching the second WiFi module from a roaming restriction mode to a restriction release mode to release a roaming frequency-band restriction for the second WiFi module, in response to the second WiFi module being in the roaming restriction mode, the first WiFi module being in a disconnected state, and the second WiFi module being in the connected state.

2. The method according to claim 1, further comprising:

switching the first WiFi module from the roaming restriction mode to the restriction release mode to release a roaming frequency-band restriction for the first WiFi module, on condition that the first WiFi module is in the roaming restriction mode when the second WiFi module is in a disconnected state and the first WiFi module is in the connected state.

3. The method according to claim 1, wherein the second WiFi module is a main WiFi module, and the method further comprises:

controlling the second WiFi module to be in the restriction release mode to allow the second WiFi module to roam.

4. The method according to claim 3, further comprising:

after controlling the first WiFi module to be in the first roaming restriction mode to restrict the first WiFi module to roam in the first frequency band:

disconnecting the first WiFi module once the second WiFi module roams to the first frequency band.

5. The method according to claim 3, further comprising:

after controlling the first WiFi module to be in the first roaming restriction mode to restrict the first WiFi module to roam in the first frequency band:

controlling the first WiFi module to switch from the first roaming restriction mode to the second roaming restriction mode to restrict the first WiFi module to roam in the second frequency band, once the second WiFi module roams to the first frequency band.

6. The method according to claim 1, further comprising:

comparing a historical signal-transceiving capability of each of the first WiFi module and the second WiFi module in the second frequency band and selecting a WiFi module with a higher signal-transceiving capability to operate, once the first WiFi module is forced to be disconnected due to no available AP in the first frequency band near a mobile terminal with the dual WiFi modules.

7. The method according to claim 6, wherein the historical signal transceiving capability of the first WiFi module in the second frequency band is determined based on historical average transmission power of the first WiFi module in the second frequency band, historical average transmission delay of the first WiFi module in the second frequency band, a historical average packet loss rate of the first WiFi module in the second frequency band, a historical average downlink transmission rate of the first WiFi module in the second frequency band, and a historical average uplink transmission rate of the first WiFi module in the second frequency band.

8. A mobile terminal, comprising:

a first WiFi module and a second WiFi module, wherein the first WiFi module and the second WiFi module are each capable of operating in both a first frequency band and a second frequency band, and the first WiFi module and the second WiFi module are capable of operating simultaneously;

a processor and a memory, wherein the memory is configured to store one or more programs, the one or more programs are configured to be executed by the processor, and the programs comprise instructions for executing:

controlling the first WiFi module to be in a first roaming restriction mode to restrict the first WiFi module to roam in the first frequency band in response to both the first WiFi module and the second WiFi module being in a connected state, the first WiFi module being connected with an access point (AP) operating at the first frequency band, and the second WiFi module being connected with an AP operating at the second frequency band, the first frequency band being not overlapped with the second frequency band; and controlling the second WiFi module to be in a second roaming restriction mode to restrict the second WiFi module to roam in the second frequency band; and wherein the programs further comprise instructions for executing:

switching the second WiFi module from a roaming restriction mode to a restriction release mode to release a roaming frequency-band restriction for the second WiFi module, in response to the second WiFi module being in the roaming restriction mode, the first WiFi module being in a disconnected state, and the second WiFi module being in the connected state.

9. The mobile terminal according to claim 8, wherein the programs further comprise instructions for executing:

switching the first WiFi module from the roaming restriction mode to the restriction release mode to release a roaming frequency-band restriction for the first WiFi module, on condition that the first WiFi module is in the roaming restriction mode when the second WiFi module is in a disconnected state and the first WiFi module is in the connected state.

10. The mobile terminal according to claim 8, wherein the second WiFi module is a main WiFi module, and the programs further comprise instructions for executing:

controlling the second WiFi module to be in the restriction release mode to allow the second WiFi module to roam.

11. The mobile terminal according to claim 10, wherein the programs further comprise instructions for executing:

after controlling the first WiFi module to be in the first roaming restriction mode to restrict the first WiFi module to roam in the first frequency band:

disconnecting the first WiFi module once the second WiFi module roams to the first frequency band.

12. The mobile terminal according to claim 10, wherein the programs further comprise instructions for executing:

after controlling the first WiFi module to be in the first roaming restriction mode to restrict the first WiFi module to roam in the first frequency band:

controlling the first WiFi module to switch from the first roaming restriction mode to the second roaming restriction mode to restrict the first WiFi module to roam in the second frequency band, once the second WiFi module roams to the first frequency band.

13. The mobile terminal according to claim 8, wherein the programs further comprise instructions for executing:

comparing a historical signal-transceiving capability of each of the first WiFi module and the second WiFi module in the second frequency band and selecting a WiFi module with a higher signal-transceiving capability to operate, once the first WiFi module is forced to be disconnected due to no available AP in the first frequency band near a mobile terminal.

14. The mobile terminal according to claim 13, wherein the historical signal transceiving capability of the first WiFi module in the second frequency band is determined based on historical average transmission power of the first WiFi module in the second frequency band, historical average transmission delay of the first WiFi module in the second frequency band, a historical average packet loss rate of the first WiFi module in the second frequency band, a historical average downlink transmission rate of the first WiFi module in the second frequency band, and a historical average uplink transmission rate of the first WiFi module in the second frequency band.

15. A non-transitory computer-readable storage medium for storing a computer program for electronic data interchange, wherein the computer program causes a mobile terminal having a first WiFi module and a second WiFi module to execute:

controlling the first WiFi module to be in a first roaming restriction mode to restrict the first WiFi module to roam in a first frequency band in response to both the first WiFi module and the second WiFi module being in a connected state, the first WiFi module being connected with an access point (AP) operating at the first frequency band, and the second WiFi module being connected with an AP operating at a second frequency band; and wherein the first WiFi module and the second WiFi module are each capable of operating in both the first frequency band and the second frequency band, the first WiFi module and the second WiFi module are capable of operating simultaneously, and the first frequency band is not overlapped with the second frequency band; and controlling the second WiFi module to be in a second roaming restriction mode to restrict the second WiFi module to roam in the second frequency band; and wherein the computer program further causes the mobile terminal to execute:

switching the second WiFi module from a roaming restriction mode to a restriction release mode to release a roaming frequency-band restriction for the second WiFi module, in response to the second WiFi module being in the roaming restriction mode, the first WiFi module being in a disconnected state, and the second WiFi module being in the connected state.

\* \* \* \* \*